3,346,809
CABLE INSULATION TEST APPARATUS INCLUDING A FLUID CONTAINING CYLINDRICAL TEST BUSHING HAVING A PLURALITY OF ELECTRODES AND CONDENSER STACKS POSITIONED ALONG A PAIR OF INSULATING TUBES CONNECTING THE ELECTRODES
George Bader, Metuchen, and George S. Eager, Jr., Upper Montclair, N.J., assignors to General Cable Corporation, New York, N.Y., a corporation of New Jersey
Filed June 28, 1966, Ser. No. 561,275
11 Claims. (Cl. 324—54)

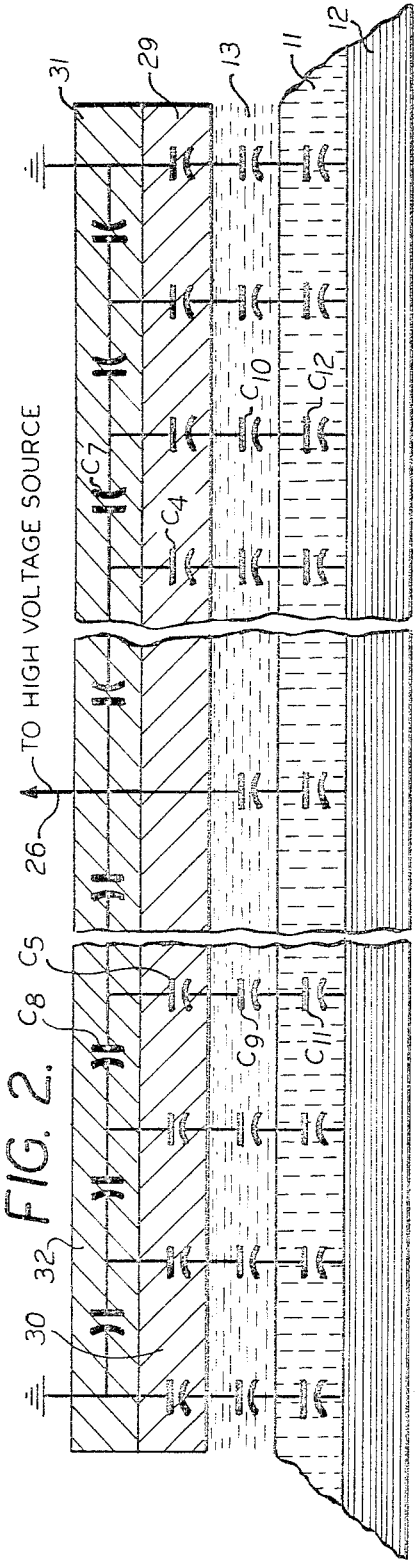
FIG. 2.
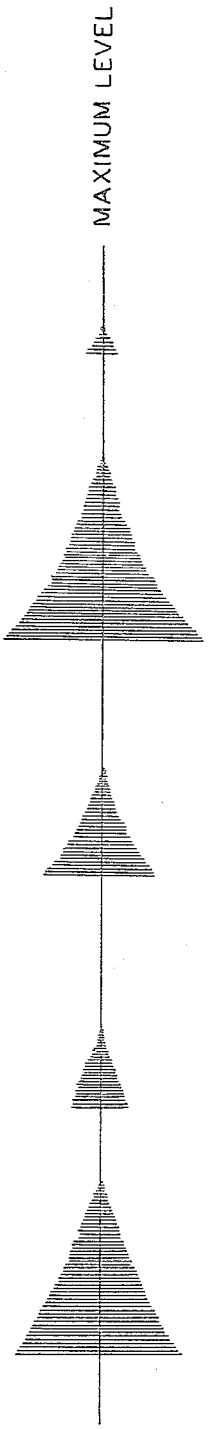
FIG. 4. IONIZATION EXTINCTION VOLTAGE (DETERMINED BY THE HIGHEST AMPLITUDE)
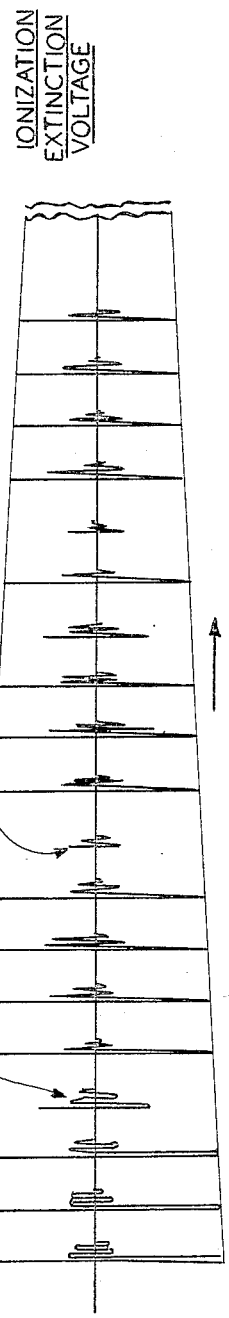
FIG. 5.
INVENTORS
GEORGE BADER
GEORGE S. EAGER, JR.
BY
ATTORNEYS.

This invention relates to improved method and apparatus for measuring ionization inception and extinction voltages in unshielded high voltage electrical cables. More particularly it relates to method and apparatus for making such measurements as the unshielded cable moves continuously through the apparatus.

A conductor insulated with plastic, rubber or other insulation often is subjected to a so-called ionization test before a shield is put on over the insulation. This test consists of the measurement of the ionization inception or extinction voltages. At the present time two methods for making such ionization tests commonly are used.

The first method involves immersing the full reel length of the cable in water which creates a grounded shield for the insulation. Under this condition the insulation inception and extinction voltages are determined by applying high voltage to the cable conductor and using any known ionization measurement method.

The main advantage of this method is that it permits direct measurement of ionization inception and extinction voltages. A disadvantage of this method is in its lower sensitivity, because the test is made on a full length of cable with no possibility of knowing the location of any bad spots in the cable. Very often false indications of ionization are obtained because air bubbles may remain on the surface of the cable insulation, and surface discharges may occur on the cable insulation appearing at the water surface and along the ends of the cable which are not immersed.

The second method involves immersing only a short length of the cable in a liquid in which the voltage stress changes along the cable insulation gradually from zero value to the maximum value and again to zero value. To obtain this stress distribution an electrode which surrounds the cable and is in electrical contact with the liquid is connected to the high voltage supply. Two other electrodes which also surround the cable and are in electrical contact with the liquid are placed at each side of the middle electrode and are grounded. The cable undergoing test is moved through this apparatus. The ionization signals are detected by probes which are either coupled to the high voltage electrode, or are immersed in the liquid at points between the high voltage and the grounded electrodes.

An advantage of the second method is its high sensitivity. Because only a short length of the cable is subjected to the test at any instant the location of a bad spot in the cable is quickly determined. Also, no false indications occur due to air bubbles on the cable surface and surface discharges. A disadvantage of this method is that it measures ionization pulses which are proportional not only to the ionization inception voltage of the cable, but also to the ionization intensity. Hence, this method may give only qualitative information regarding the ionization inception voltage and it can not give any information regarding the ionization extinction voltage.

It is an object of the present invention to provide an improved method and apparatus for measurement of ionization inception and extinction voltages of unshielded cables, with high sensitivity, without false results caused by extraneous factors, and with accurate location of bad spots in the cable.

Other objects and advantages of the invention will be pointed out or will become apparent as the description proceeds.

The drawings forming a part hereof show preferred embodiments of the invention selected for illustrative purposes only. The same reference characters are used to designate the same parts throughout the drawings, in which:

FIGURE 2 is an approximate electrical equivalent circuit of the test bushing of the test apparatus showing the liquid and cable under test inside the bushing;

FIGURE 3 is an approximate electrical equivalent circuit of the test apparatus;

FIGURE 4 represents a record of ionization extinction voltage for a cable under test; and FIGURE 5 is an extended record of the ionization extinction voltage of a cable under test.

Figure 1:
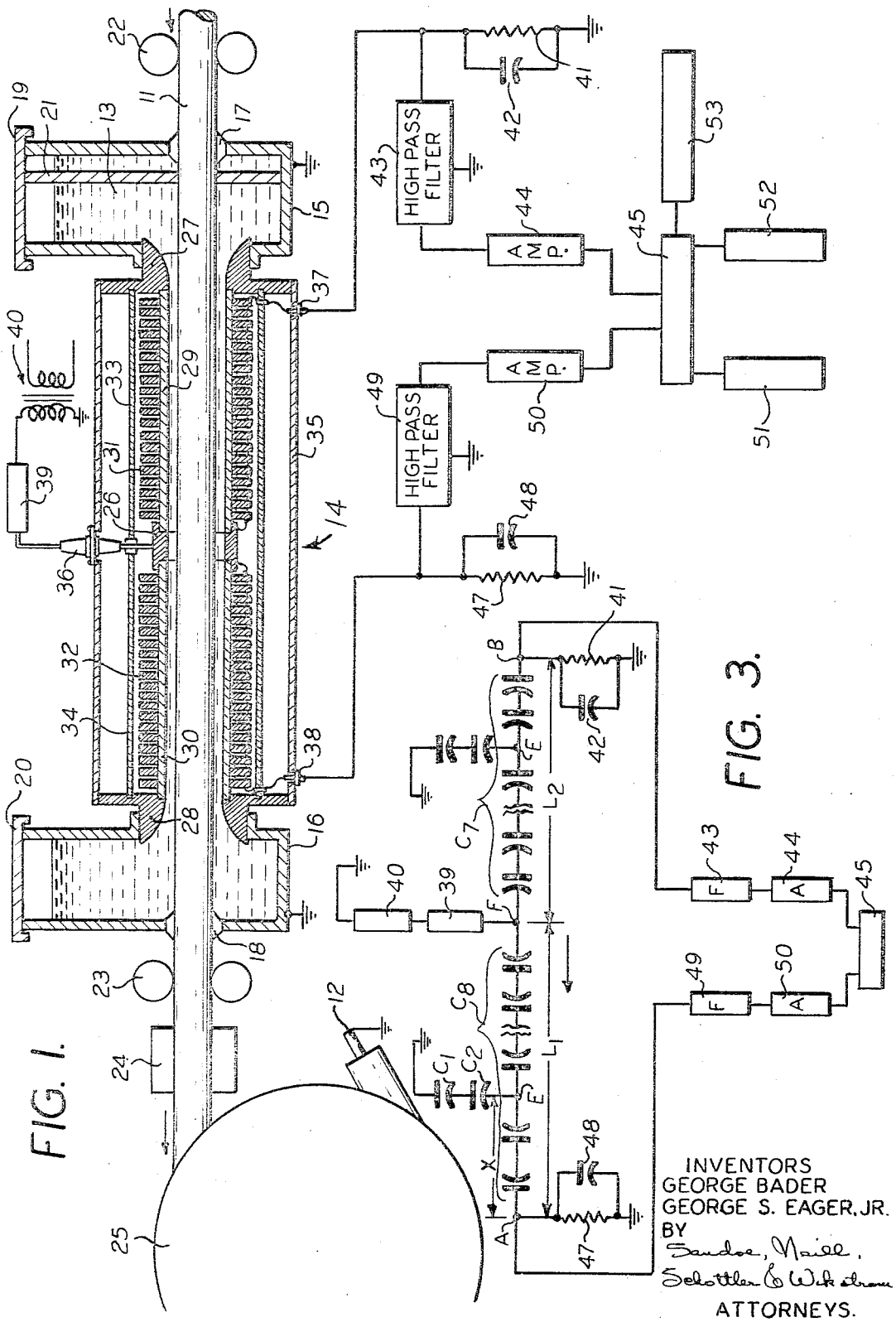
FIGURE 1 is a view representing a vertical section through the longitudinal axis of the test apparatus, including a schematic diagram of the associated electrical circuits.

Referring first to FIGURE 1, a short portion of a high voltage unshielded plastic or rubber insulated cable 11, which has its conductor 12 grounded, is immersed in a body of high dielectric constant liquid 13. During the test the cable is moved through the liquid in the direction of the arrow in a continuous operation, so that successive portions of the cable are immersed in the liquid. The liquid 13 is contained within a tubular test bushing 14 and two metal containers 15 and 16 secured to the respective ends of the test bushing with liquid-tight joints. In the wall of the container 15, in coaxial alignment with the test bushing 14, is a wipe opening 17 which serves to permit entry of the cable 11 into the liquid 13 while preventing leakage of the liquid around the entering cable. A similar wipe opening 18 is provided in the wall of the container 16 which serves to permit passage of the cable out of the liquid 13 while preventing leakage of the liquid around the cable. The cable is centered in the wipe openings 17 and 18, and therefor in the tubular test bushing 14, by suitable guides such as the rotating guides illustrated at 22 and 23. Container 15 preferably is provided with an additional wipe 21 to remove any air bubbles which may remain on the surface of the cable after the cable has moved through the wipe opening 17 into the liquid 13.

The containers 15 and 16 are provided with covers 19 and 20, respectively, to protect the liquid against contamination by dust or other extraneous matter which might otherwise fall into the containers. The metal containers 15 and 16 are grounded as indicated in FIGURE 1. After the cable leaves the liquid 13 it is rinsed in a container 24 and wound onto a reel 25.

The test bushing 14 comprises a centrally located high voltage cylindrical metal electrode 26, two grounded cylindrical metal electrodes 27 and 28 located at the ends of the test bushing, two tubes 29 and 30 made of insulating material separating the electrodes, two condenser stacks 31 and 32 mounted on the outer surfaces of the insulating tubes 29 and 30, and two insulating tubes 33 and 34 covering the condenser stacks 31 and 32. Enclosing the test bushing 14 between the grounded electrodes 27 and 28 is a grounded metal shield 35 which has a centrally located high voltage insulating bushing 36 and two low voltage insulating bushings 37 and 38 at either end for making electrical connections between the test bushing 14 and the electrical circuits external of the shield 35.

The high voltage electrode 26 of the test bushing is connected through the high voltage insulating bushing 36 and impedance 39 to the high voltage power frequency source 40. The low voltage electrodes 27 and 28 of the test bushing and the shield 35 are grounded. One end of each of the condenser stacks 31 and 32 is connected to the high voltage electrode 26 of the test bushing. The other end of the condenser stack 31 is connected through resistor 41 and capacitor 42, arranged in parallel, to ground, and also is connected to the high pass filter 43. The other end of filter 43 is connected through amplifier 44 to the dividing circuit 45. The other end of the condenser stack 32 is connected through resistor 47 and capacitor 48, arranged in parallel, to ground, and also is connected to the high pass filter 49. The other end of filter 49 is connected through amplifier 50 to the dividing circuit 45.

This dividing circuit may be connected to a recorder 51 of ionization inception or extinction voltages, to an alarm system 52 which warns of lower values of ionization inception or extinction voltages than a prechosen value, and to the device 53 for indicating ionization inception or extinction voltages.

Any ironization in a void in the insulation of a cable moving through the test bushing 14 will produce two output pulses, one from each of the test bushing. These two pulses will be divided one by another in the circuit 45 so that the output pulse from the dividing circuit 45 depends only on the ratio of the pulses which are produced at the ends of the test bushing.

When a void exists in which ionization occurs in the part of the cable insulation inside the bushing, the output pulse from the dividing circuit depends on the position of the void within the test bushing. The pulse does not depend on the ionization intensity. When the void is close to entering end of the bushing, its ionization causes a large pulse on output through filter 43 and a small pulse on output through filter 49. Hence, the ratio of the pulse of output to filter 43 to the pulse of output to filter 49 is large. When the void moves with the cable toward exiting end of the bushing, the ratio of output pulse to filter 43 to output pulse to filter 49 decreases and the dividing circuit output pulse decreases. Hence the closer the void is to the entering end of the bushing, the larger is the value of the dividing circuit output pulse. When the void passes through the test bushing and reaches a certain point between the entering end and the middle electrode 26 of the test bushing, it starts to ionize. Under these conditions, the dividing circuit output pulse is the greatest. The ionization incepion voltage of he cable is indicated by the largest drividing circuit output pulse 45, which is easy to measure. The lower the ionization inception voltage of the tested cable, the larger is the dividing circuit output pulse.

If the dividing circuit 45 is adjusted so that it measures the ratio of output pulse to filter 49 to the output pulse to filter 43, as the cable moves from the entering end toward the exiting end of the test bushing, the largest dividing circuit output pulse indicates the ionization extinction voltage of the cable.

The voltage distribution along the part of the cable which is inside the test bushing may be computed on the basis of an approximate substitute electrode circuit of the bushing with the liquid and cable inside, shown in FIGURE 2 of the drawings.

Capacitances $C_7$ and $C_8$ represent the capacitances of the condenser stacks 31 and 32 respectively. Capacitances $C_4$ and $C_5$ represent the radial capacitances of the insulating tubes 29 and 30 respectively. Capacitances $C_9$ and $C_{10}$ represent the radial capacitances of the liquid 13 taking into account only length "L" equal to the length of one insulating tube. Capacitances $C_{11}$ and $C_{12}$ represent the radial capacitances of the tested cable insulation for the length "L".

The longitudinal capacitances of the cable insulation, of the liquid 13 and the insulating tubes 33 and 34 are not shown in FIGURE 2. They are small in comparision with their respective radial capacitances and for practical considerations they do not have any significant influence on measurements made according to this invention. The resistances of all components of the bushing with liquid and cable under test are not shown in FIGURE 2 because the dissipation factors of these components are below unity and their resistances have no significant influence on the voltage distribution along the cable.

In order to assure practically (with correction factor less than ±10%) uniform radial voltage stress distribution along the tested cable insulation on both sides of the high voltage electrode 26 the following requirements should be fulfilled:

$$L_1 = L_2$$

$$C_7 = C_8$$

$$\frac{\Delta C_7}{\Delta L_2} = \frac{\Delta C_8}{\Delta L_1} = \text{constant}$$

$$C_5 = C_4$$

$$R - r \ll L$$

$$\frac{1}{C_5} + \frac{1}{C_9} < \frac{1}{C_{11}}$$

$$\frac{1}{C_4} + \frac{1}{C_{10}} < \frac{1}{C_{12}}$$

$$C_8 \left( \frac{1}{C_5} + \frac{1}{C_9} + \frac{1}{C_{11}} \right) \geq 3$$

$$C_7 \left( \frac{1}{C_4} + \frac{1}{C_{10}} + \frac{1}{C_{11}} \right) \geq 3$$

Where $R$ = external radius of the insulating tubes 29 and 30
$r$ = radius of the cable conductor 12
$L_1$ and $L_2$ = lengths of the insulating tubes 29 and 30
$C_7$ = capacitance of the stack of condensers 31 in the longitudinal direction
$C_8$ = capacitance of the stack of condenser 32 in the longitudinal direction
$C_4$ = radial capacitance of insulating tube 29
$C_5$ = radial capacitance of insulating tube 30
$C_9$ = radial capacitance of liquid 13 for the length $L_1$
$C_{10}$ = radial capacitance of liquid 13 for the length $L_2$
$C_{11}$ = radial capacitance of the tested cable insulation for the length $L_1$
$C_{12}$ = radial capacitance for the tested cable insulation for the length $L_2$ $\frac{\Delta C_7}{\Delta L_2}$ = capacitance of condenser stack 31 per unit length $\frac{\Delta C_8}{\Delta L_1}$ = capacitance of condenser stack 32 per unit length The above requirements may be defined also in the following way. The two sections of the test bushing containing the liquid and cable on either side of the middle electrode should be symmetrical from an electrical point of view. The surfaces between the cable insulation and liquid 13, between the liquid 13 and the insulating tubes 29 and 30, and the internal and external surfaces of the insulating tubes 29 and 30 should all be practically concentric cylinders. Both condenser stacks 31 and 32 should have uniform capacitance distribution. The capacitances of each stack 31 and 32 should be at least three times as large as the radial capacitance of the material enclosed between the condenser stacks and the conductor, consisting of the insulation tube, the liquid and the cable insulation. The radial capacitances of the insulating tube and the liquid should be much greater than the radial capacitance of the cable insulation to assure practically the same longitudinal voltage distribution on the cable surface as on the condenser stacks.

Operation of this arrangement may be considered on the basis of the approximate substitute circuit shown in FIGURE 3.

The capacitance $C_1$ represents the capacitance of a void in the cable insulation. The capacitance $C_2$ represents the coupling capacitance between the void and point E of the condenser stack, which point is on the same radius as the void. This capacitance consists of the partial capacitance of the insulating tube, of the partial capacitance of the liquid, and of the partial capacitance of the cable insulation. The other components of the circuit shown in FIGURE 3 were explained in connection with the description of FIGURES 1 and 2.

When power frequency voltage is applied to the middle point F the potentials at points A and B are very close to ground potential because the capacitance reactance at power frequency of capacitances $C_8$ and $C_7$ is much higher than the resistance of resistors $R_{41}$ and $R_{47}$. Hence, the voltage on the cable opposite the point E, which lies between points A and F, is equal to:

$$V_E = V_S \frac{x}{L} \quad (1)$$

When point E is between points B and F the voltage to ground at point E is equal to:

$$V_E = V_S \frac{2L-x}{L} \quad (2)$$

Where:

$V_E$=voltage on the cable at point E
$V_S$=supply voltage in point F
$x$=distance between points A and E
$L$=total length of one insulation tube If ionization appears in a void represented by the capacitance $C_1$ a pulse appears at point A, the amplitude of which is:

$$V_A = \gamma \frac{1}{\frac{C_{48}}{C_8}\frac{x}{L}+1} \quad (3)$$

and a pulse appears at point B, the amplitude of which is $$V_B = \gamma \frac{1}{\frac{C_{42}}{C_7}\left(\frac{2L-x}{L}\right)+1} = \gamma \frac{1}{\frac{C_{48}}{C_8}\left(\frac{2L-x}{L}\right)+1} \quad (4)$$

assuming that $C_{42}=C_{48}$ and $C_8=C_7$ where $V_A$=voltage amplitude of the pulse at point A
$V_B$=voltage amplitude of the pulse at point B
$\gamma$=voltage depending on ionization intensity and on the capacitances $C_{42}$, $C_8$, $x/L$ and $C_2$ These two pulses with amplitudes $V_A$ and $V_B$ respectively are passed through high pass filters 49 and 43 and amplified by the amplifiers 50 and 44 respectively. Then they are divided in the dividing circuit 45. The dividing circuit is adjusted to divide the amplitude of pulse $V_A$ by the amplitude of pulse $V_B$, or it may be adjusted in the opposite way which means that it would divide the amplitude of $V_B$ by the amplitude of $V_A$.

First let us consider the case which the cable moves in the direction indicated by arrow in FIGURE 3 and the dividing circuit 45 divides the amplitude of pulse $V_B$ by the amplitude of pulse $V_A$. When a void existing in the cable moves in the direction indicated by the arrow to a certain point E, lying between points B and F, where the voltage is sufficient to create ionization in the void, this void starts to ionize. The voltage on the cable at the point where the void exists is expressed by Equation 2.

The ratio which creates the output pulse from dividing circuit 45 of the amplitude of the pulse $V_B$ to the amplitude of the pulse $V_A$ may be computed from Equations 3 and 4 and is equal to:

$$\Delta_1 = \frac{V_B}{V_A} = \frac{\frac{C_{48}}{C_8}\frac{x}{L}+1}{\frac{C_{48}}{C_8}\left(\frac{2L-x}{L}\right)+1} = \frac{\frac{C_{48}}{C_8}\frac{x}{L}+1}{\frac{C_{48}}{C_8}\left(2-\frac{x}{L}\right)+1} \quad (5)$$

Where $\Delta_1$ is the amplitude of the output pulse from the dividing amplitude $V_B$ by the amplitude $V_A$.

Equation 5 indicates that the ratio $V_B/V_A$ is the greater, the greater the ratio $x/L$. The greatest ratio of $x/L$ appears at the point where the void starts to ionize. The movement of the ionizing void in the direction shown by the arrow in FIGURE 3 causes a drop of the ratio $x/L$ and drop of the pulse $$\Delta_1 = \frac{V_B}{V_A}$$

A measurement of the highest value of the pulse $\Delta_1$ permits establishment of the ionization inception voltage of the part of the cable under test. The ionization inception voltage of the cable may be computed from Equations 2 and 5 and is equal to:

$$V_{incep} = V_S \frac{2-(\Delta_1 \max -1)\frac{C_8}{C_{48}}}{\Delta_1 \max +1} \quad (6)$$

Where:

$V_{incep}$=ionization inception voltage
$V_S$=supply voltage
$\Delta_1$ max.=maximum amplitude of the output pulse from the dividing circuit
$\frac{C_8}{C_{48}}$=ratio of the capacitances of the bushing—constant For the second case, let us consider the case when the cable moves in the direction indicated by arrow in FIGURE 3 and the dividing circuit 46 divides the amplitude of the pulse $V_A$ by amplitude of the pulse $V_B$. By analogy with the above considerations, the highest amplitude of the output pulse from the dividing circuit will be obtained at the smallest ratio of $x/L$. This smallest ratio of $x/L$ determines the ionization extinction voltage of the cable. By measuring the highest amplitude of the output pulse from the dividing device, the ionization extinction voltage of the test part of the cable may be obtained. The ratio of the amplitude of pulse $V_A$ to the ratio of the amplitude of pulse $V_B$ may be computed from Equations 3 and 4 and is equal to:

$$\Delta_2 = \frac{V_A}{V_B} = \frac{\frac{C_{48}}{C_8}\left(\frac{2L-x}{L}\right)+1}{\frac{C_{48}}{C_8}\frac{x}{L}+1} = 2\frac{\frac{C_{48}}{C_8}+1}{\frac{C_{48}}{C_8}\frac{x}{L}+1} - 1 \quad (7)$$

Where $\Delta_2$— is the amplitude output pulse from the dividing circuit when it is adjusted so that it divides the amplitude $V_A$ by the amplitude $V_B$.

Combining Equations 1 and 7 the ionization extinction voltage of the part of the cable under test may be found:

$$V_{ex} = V_S \frac{2-(\Delta_2 \max -1)\frac{C_8}{C_{48}}}{\Delta_2 \max +1} \quad (8)$$

Where:

$V_{ex}$=ionization extinction voltage
$V_S$=supply voltage
$\Delta_2$ max.=maximum amplitude of the output pulse from the dividing circuit
$\frac{C_{48}}{C_8}$=ratio of the compacitances—constant If the scale of the measuring, recording or determining device is made according to Equation 8, which is similar to Equation 6, the direct indications of ionization extinction voltage of the part of the cable under test may be obtained.

Some of the dividing circuits do not have a linear scale which means that the output pulse is a function $f$ of the ratio of the input pulses. In this case the function $f$ should be taken into account in Equations 6 and 8. This non-linearity does not prevent making scales for the measuring, recording or determining devices which will give direct indications of ionization inception or extinction voltages.

The dividing circuit 45 comprises two logarithmic amplifiers feeding into a voltage differential circuit. These logarithmic amplifiers are well known and are used in computing machines.

In the part of cable under test it is possible that instead of one void numerous voids may exist and several of them may be in the same area of the test bushing where the voltage exceeds their ionization inception voltage. Hence, ionization may occur in several voids almost simultaneously. However, it is very improbable that discharges in two or more of these many voids will occur at exactly the same time because the duration of one discharge is of the order of nanoseconds, i.e. billionths of a second. Hence, most of the readings are not affected by simultaneous discharges. It may be mathematically or experimentally shown that in the case when one void is in a part of the bushing corresponding, for instance, to the ionization inception or extinction voltage, and at the exact time when a discharge appears in this void, discharges also appear in other voids in the bushing, the amplitude of the output pulses from the dividing circuit $\Delta_1$ or $\Delta_2$ will become smaller rather than larger. Ionization inception or extinction voltages of the cable under test are determined by many pulses with large amplitudes. Missing some of them does not change the results. In FIGURE 4 is shown a regular record of the ionization extinction voltage of a tested cable. The peak value of the amplitude of the group of pulses indicates the ionization extinction voltage of the cable. A record of no pulses indicates that the ionization inception voltage of this part of the cable is above the supply voltage.

In FIGURE 5 is shown an extended record of the ionization extinction voltage of a tested cable with some pulses of decreased amplitude as the result of pulses which appeared in other voids. This indicates that the decreasing of amplitude of some of the pulses does not interfere with correct interpretation of the pattern of signals.

The method and apparatus for measurement of the ionization inception or extinction voltages of a moving unshielded cable described herein is insensitive to electrical or magnetic noise. Any noise appearing in the cable conductor or in the high voltage supply produces two pulses with equal amplitudes $V_A = V_B$. In this case the indication of this method is the same as if the ionization inception voltage of the cable were above the supply voltage. This means that noise is not indicated.

Merely as an example, the following data apply to an apparatus built for measurement of ionization extinction or inception voltages up to 30 kv. in polyethylene insulated cables:

Length of insulating tubes $L_1 = L_2 = 24$ inches
Each capacitance stack 31, 32 consists of 25 capacitors, the capacitance of each stack $C_7 = C_8 = 400$ pf.
The capacitances $C_{48} = C_{42} = 3000$ pf.
The resistances $R_{47} = R_{42} = 10,000$ ohms
High voltage impedance 39 at power frequency $Z = \omega L = 10$ ohms
The high pass filters 43 and 49 decrease the power frequency about 150 decibels
The amplification factor of the amplifiers 44 and 50 is 60 decibels
The dividing circuit 45 has a hyperbolic scale As a recorder 51 a cathode ray oscilloscope with a photographic film moving in proportion to the cable movement is used
As an indicating device 53 a peak voltmeter is used
The alarm system 52 functions when pulse amplitudes exceed a predetermined value, i.e. it gives an alarm when the ionization inception or extinction voltage is below certain level
As the high dielectric constant liquid 13 is a mixture or glycerol with alcohol is used
The supply voltage is 30 kv.

The method and apparatus of this invention permit measurement and recording of the ionization inception or extinction voltages of high voltage unshielded moving cable and they permit precise location of any bad spot in the cable. If the ionization inception or extinction voltages of the cable drop below a predetermined level an alarm may be obtained. This method has high sensitivity because only a short piece of cable is tested at a time. The results are not subject to interference by electrical or magnetic noise which may originate in the test area, or by any additional factors such as these which interfere with the results of the first prior art method described hereinabove. Voids as large as 20 mils usually escape detection by the prior art methods, while much smaller voids are disclosed by the method and apparatus of this invention.

The foregoing is a description of preferred embodiments of the invention and it will be understood that various modifications may be made without departing from the spirit of the invention or the scope of the claims.

We claim:

1. Apparatus for continuously measuring the ionization inception voltage or the ionization extinction voltage of an insulated conductor as the conductor is moved longitudinally through the apparatus comprising, in combination, a cylindrical test bushing including a centrally located high voltage cylindrical electrode and two grounded cylindrical electrodes arranged in aligned relation with and spaced from the high voltage electrode on opposite sides thereof, a high voltage power frequency source connected between the high voltage electrode and ground, insulating tubes extending between the high voltage electrode and the grounded electrodes and connected thereto in fluid-tight relation, closures for the ends of the test bushing provided with means to permit an insulated conductor to be moved coaxially through the test bushing, high dielectric constant liquid filling the space within the test bushing through which the insulated conductor moves, ionization voltage measuring apparatus, condenser stacks arranged longitudinally along the outer surfaces of the insulating tubes and connected each at one terminal to the high voltage electrode and at the opposite terminal to the ionization voltage measuring apparatus, and a metal shield connected to the grounded electrodes and enclosing the high voltage electrode and the condenser stacks.

2. Apparatus according to claim 1, in which the grounded electrodes are at equal distances from the high voltage electrode and in which the condenser stacks are alike.

3. Apparatus according to claim 1, in which the means in the end closures to permit an insulated conductor to be moved through the test bushing comprise packing glands which are compressed against the conductor moving therethrough to prevent leakage of the high dielectric constant liquid from the test bushing.

4. Apparatus according to claim 1, in which the closures for the ends of the test bushing include reservoir containers for holding additional high dielectric constant liquid to keep the test bushing filled.

5. Apparatus according to claim 1, including guide means for disposing the conductor coaxially within the test bushing as it moves therethrough.

6. Apparatus according to claim 1, in which the ionization voltage measuring apparatus includes means for deriving the ratio of the voltage amplitudes of the pulses set up in the two condenser stack circuits by ionization of a void in the conductor insulation as the conductor passes through the test bushing.

7. Apparatus according to claim 6, in which the derived ratio is the voltage amplitude of the pulse in the cable entering end of the bushing divided by the voltage amplitude of the pulse in the cable exiting end of the bushing to give the ionization inception voltage.

8. Apparatus according to claim 6, in which the derived ratio is the voltage amplitude of the pulse in the cable exiting end of the bushing divided by the voltage amplitude of the pulse in the cable entering end of the bushing to give the ionization extinction voltage.

9. Apparatus according to claim 6, including an indicator for indicating the ionization voltage of the insulated conductor in volts.

10. Apparatus according to claim 6, including a recorder for continuously, recording the ionization voltage of the insulated conductor as it is moved through the apparatus.

11. Apparatus according to claim 6, including alarm means which is operated when the ionization voltage of the insulated conductor falls outside of a preselected acceptable range.

References Cited
UNITED STATES PATENTS

| | | | |
|---|---|---|---|
| 2,794,168 | 5/1957 | Gooding | 324—54 |
| 3,047,799 | 7/1962 | Peer et al. | 324—54 |
| 3,229,199 | 1/1966 | Mildner | 324—54 |

RUDOLPH V. ROLINEC, *Primary Examiner.*

GERARD R. STRECKER, *Assistant Examiner.*